(No Model.)
F. MANKEY.
SURFACE CUT LUMBER AND PROCESS OF MAKING THE SAME.
No. 309,071. Patented Dec. 9, 1884.
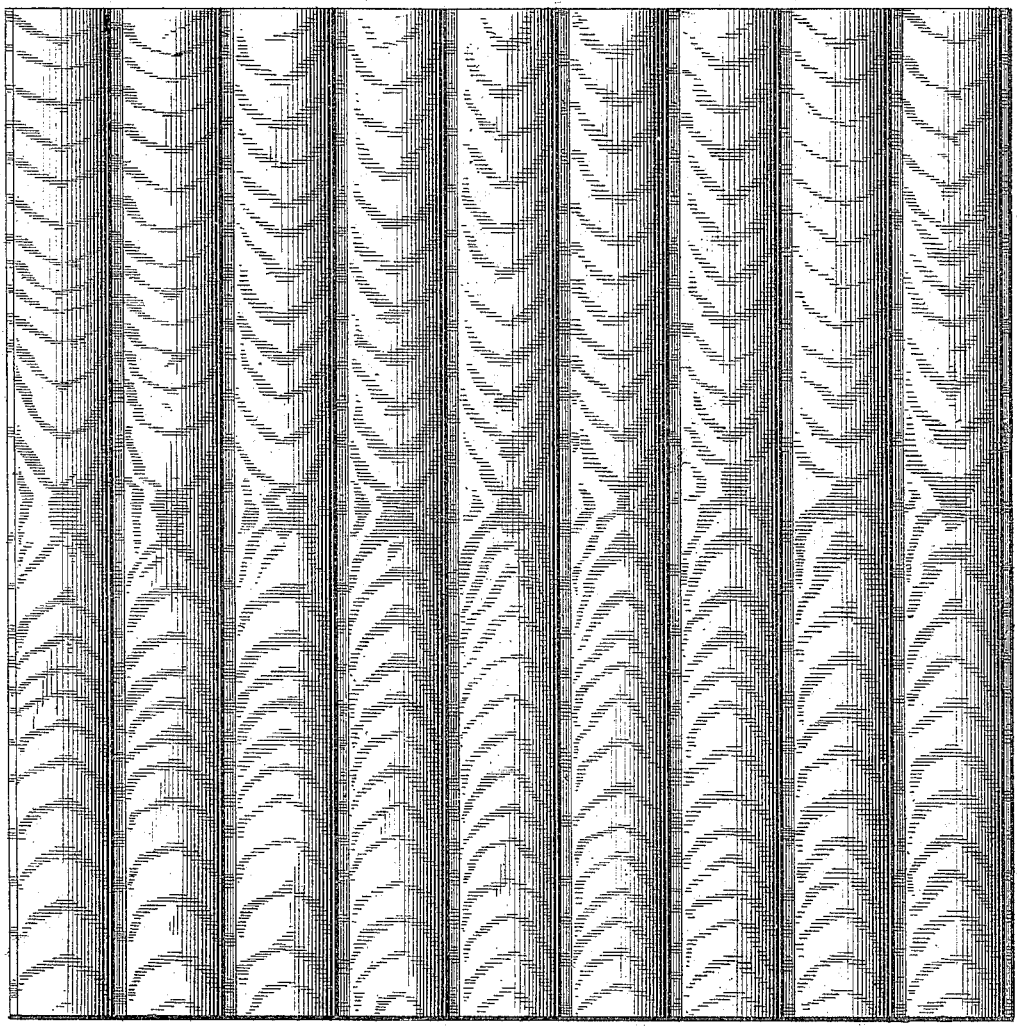
WITNESSES
INVENTOR
Frederick Mankey
by L. Deane
His Attorney

UNITED STATES PATENT OFFICE.

FREDERICK MANKEY, OF WILLIAMSPORT, PENNSYLVANIA.

SURFACE-CUT LUMBER AND PROCESS OF MAKING THE SAME.

SPECIFICATION forming part of Letters Patent No. 309,071, dated December 9, 1884.

Application filed August 19, 1884. (No model.)

*To all whom it may concern:*

Be it known that I, FREDERICK MANKEY, a citizen of the United States, residing at Williamsport, in the county of Lycoming and State of Pennsylvania, have invented certain new and useful Improvements in Surface-Cutting of Wood, of which the following is a specification, reference being had therein to the accompanying drawings.

Figure 1 illustrates the surface produced on a piece of wood by my new process. Fig. 2 is an edge view of the same.

My invention relates to a new and improved process of treating the surfaces of wood, whereby I produce a novel and beautiful effect thereon, bringing out the grain of the woods in the most effectual manner, and also providing that the surface of the wood shall be cut in regular and exact lines; and the nature of my invention consists in a process of treating any kind of wood by cutting the same at an angle with respect to the length of the grain and at different depths, as will appear from the following description, when taken in connection with the annexed drawings.

My novel process of treating wood may be conducted on the well-known "Wardwell's saw-bench" by substituting for the saw a planer-cutter, the shape of the cutting-edges of which will give the desired configuration. I remove the saw from this machine and substitute a cutter, which is keyed to the arbor in any well-known or suitable manner.

The machine aforesaid is provided with adjustable gages for guiding the work.

The gist of my invention and process consists in offering the wood to the cutter at right angles, diagonally, or at any other angle with respect to the length of the grain of the wood.

I have above referred to one well-known wood-cutting machine, for the purpose of showing that my process can be conducted with it as stated above; but I do not confine myself to the use of said machine, for the reason that my process can be carried out on almost any other machine provided with a rotary arbor for the cutter.

I cut the wood across the grain for the purpose of perfect cutting, also for the purpose of producing a velvety effect by bringing out a waved or irregular surface, the different forms, configurations, or colors of the woody fibers. The elevations and depressions which are produced by the rotary cutter may have plane or curved surfaces, and I may at proper intervals leave deep grooves between the said elevations and depressions, according to the predetermined design.

Let it be understood that in conducting my improved process I do not limit myself to any configuration of design, as an almost indefinite variety of designs may be adopted, the gist of my process consisting in surface-cutting the wood at an angle with respect to the length of the grain, so as to produce elevations and depressions in the surface cut.

It is obvious from the above description that any desired design in cutting across the grain can be produced by changing the knives or cutters, each different shape or contour having its own cutter, which is applied to what is well-known as a "rotary cutter-head."

It is also obvious that the same design can be cut upon the reverse surface of the wood.

By means of the above-described process boards twenty inches across can be rapidly and correctly cut—a result not attainable by any method now known or practiced.

It is very obvious that it makes no difference whether the wood is moved or the cutter is moved to carry out my above invention.

This new cross-cut-surface wood is susceptible of many uses, and is, for instance, specially adapted for paneling in railroad-cars, for furniture ornamentation, and in ornamental architectural work, and for wood trimmings generally.

I do not under this application, which bears even date with the filing of another application, (marked Case B,) Serial No. 140,955, claim the method of producing ornamental combinations by means of surface cross-cut wood.

I am aware that sometimes ornamental wood surfaces of the general description above set forth have been made by hand and by the use of various tools in each given case; but this process is very long and tedious, requiring great accuracy and skill to produce a suitable result, and even then not infrequently the lines are not all true, and a careful scrutiny will disclose faults and irregularities. By the process I have described the result, even when the work has been done by a comparatively unskilled person, is always true and perfect in all its lines. Besides this, there is a very great difference in the cost between the hand-work product and the machine product. The difference in appearance is discernable at sight by the ordinary buyer or user, and radically distinguishes the one product from the other. Indeed such a product as mine has never before been known in the market as an individual article of sale, because there was no known way of making it at a purchasable price.

What I claim as my invention is—

1. The within-described process of treating wood surface by rotary machine-cutters, which consists in traversing said cutters upon the face of the lumber at an angle to the direction of the grain, whereby the wood is exactly and regularly cut at varying depths across the grain, substantially as described.

2. As a new article of manufacture, a board the surface of which is exactly and regularly cut or grooved at an angle to the grain with deep and shallow depressions by the passage of rotary cutters thereover, substantially as described.

In testimony whereof I affix my signature in presence of two witnesses.

FREDERICK MANKEY.

Witnesses:
H. B. ZEVELY,
A. N. ZEVELY.